S. OLDHAM.
VEHICLE WHEEL.
APPLICATION FILED JUNE 28, 1910.
1,015,064.
Patented Jan. 16, 1912.
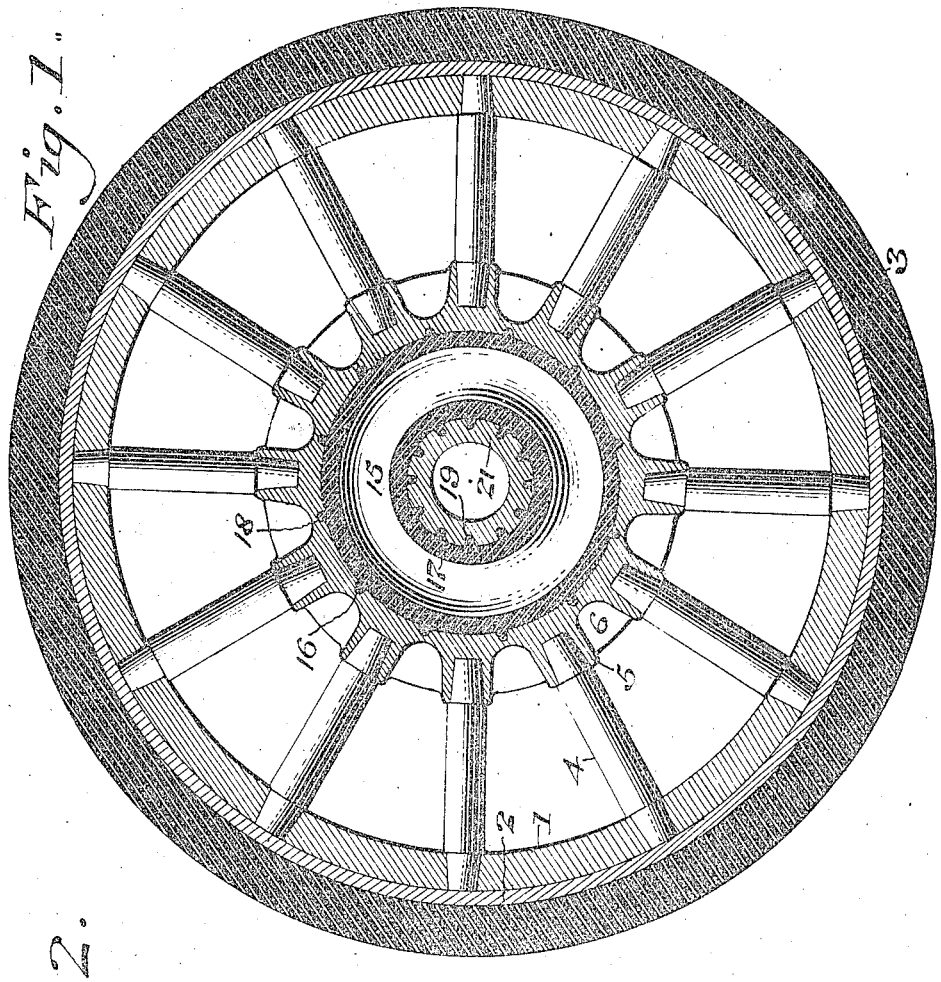
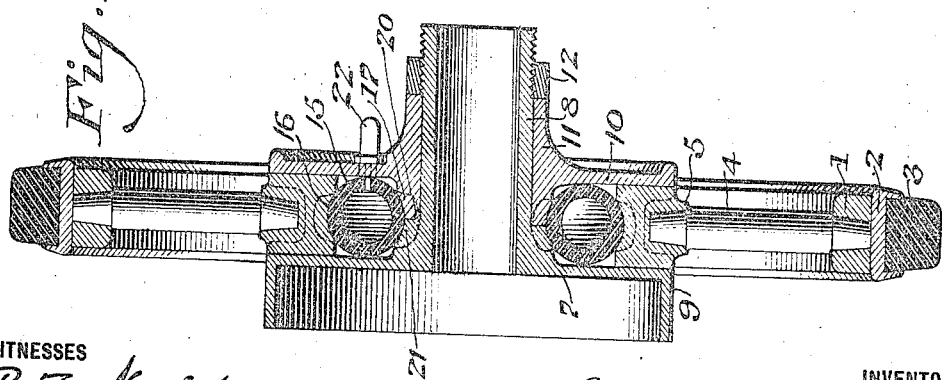
WITNESSES
P. F. Nagle.
L. Douville.
INVENTOR
Samuel Oldham.
BY
Wiederheim Fairbanks
ATTORNEYS

UNITED STATES PATENT OFFICE.

SAMUEL OLDHAM, OF PHILADELPHIA, PENNSYLVANIA.

VEHICLE-WHEEL.

1,015,064.  Specification of Letters Patent.  Patented Jan. 16, 1912.

Application filed June 28, 1910. Serial No. 569,312.

*To all whom it may concern:*

Be it known that I, SAMUEL OLDHAM, a citizen of the United States, residing in the city and county of Philadelphia, State of Pennsylvania, have invented a new and useful Vehicle-Wheel, of which the following is a specification.

My invention consists of an improved wheel for vehicles such as automobiles and similar motor vehicles, in which the resiliency of the pneumatic tire is combined with the puncture-proof property of the solid tire.

It further consists of a wheel composed of a hub-portion, an annular portion composed of concentric rims spaced by spokes, and an intermediate annular cushioned support between said parts.

It further consists of an improved construction of the component parts of such a wheel and the improved means for securing the assembled parts together.

It further consists of other novel features of construction, all as will be hereinafter fully set forth.

For the purpose of illustrating my invention, I have shown in the accompanying drawings one form thereof which is at present preferred by me, since the same has been found in practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a vertical section, transverse to the axle, of one form of my improved wheel. Fig. 2 represents an axial section of said wheel.

The wheel has a felly, 1, having a rim, 2, in which a solid tire, 3, preferably of rubber or similar resilient material, is secured. The ends of a suitable number of radiating spokes, 4, are tenoned or otherwise secured to the two concentric rims. The inner rim is illustrated as formed with a number of sockets, 5, connected by webs, 6, into which sockets the inner tenons of the spokes are secured. A disk, 7, has a central hub-sleeve, 8, and bears against the inner side of the inner rim, and said disk is illustrated as having an inwardly projecting flange, 9, which, in the illustrated form constitutes the brake wheel for a hub-brake, although it naturally may be constructed as a sprocket wheel, or gear wheel, or may be entirely omitted, depending upon the construction and character of the vehicle upon which the wheel is employed. A disk, 10, bears against the outer side of the inner rim and has a central neck, 11, which fits upon the hub-sleeve and is secured to the same. In the form of wheel illustrated in Fig. 2, the disk and neck are retained upon the hub-sleeve and against the face of the wheel by means of a collar or nut, 12, screwed upon the sleeve and bearing against the end of the neck. An annular inclosed space is thus formed between the inner rim and the hub of the wheel, and an annular cushion support, yielding in all directions within one plane, is interposed in this space.

The cushion support consists of a tubular ring, 15, of rubber or similar resilient and airtight material, which ring is inflated to fill the annular space between the annular wheel-portion and the hub-portion. The outer and inner peripheries of this ring or hub-tire are formed with transverse ribs or lugs, 16 and 17, which respectively engage or interlock with seats or recesses, 18 and 19, respectively in the inner rim of the wheel-portion and in the hub-portion to prevent relative rotary movement of these elements. In this form, the outer disk has an inwardly extending annular flange, 20, which forms a part of the inner side of the annular cushion space and a part of the seat for the ring, and the inner disk has also an annular flange, 21, which forms the other part of the inner side of the cushion space and of the seat for the ring. A suitable valve, 22, is connected through the outer disk into the interior of the ring for the attachment and connection of an air pump or other source of compressed air to inflate the ring or hub-tire. As a wheel provided with this cushion support between an annular wheel-portion and a hub-portion revolves, the cushion support will radially yield and be compressed at the lowermost point and expanded at the uppermost part, and will cushion the vehicle in substantially the same manner as a wheel provided with any of the known forms of pneumatic tires. Owing to the fact, however, that the present improved wheel presents a solid tire to the roadbed, this wheel will not be subject to the danger of cut or punctured tires or of tires bursting under load or on suddenly striking obstructions.

As appears from Fig. 2, the inner rim of the annular wheel-portion is guided between the two disks of the hub, so as to be secured against lateral movement while perfectly free to have radial movement or movement in the plane of the wheel. The disks of the hub, the hub, and the inner rim of the annular wheel-portion form a closed annular space for the annular cushioning support, so that the latter is confined against lateral displacement without requiring any additional fastening means.

Having thus described my invention, what I claim as new and desire to secure by Letters Patent, is:—

In a wheel, a disk having a centrally projecting hub-sleeve and an annular flange at the inner end of the latter formed with a circumferential series of seats, a disk having a central outwardly projecting neck fitted upon the sleeve and an inwardly projecting flange formed with a circumferential series of seats registering with and complementary to the first-recited seats, a nut threaded upon the sleeve to bear against the end of the neck to force and hold the flanges together, an annular wheel-portion the inner rim of which has lateral confinement and radial play in the annular space formed between the disks and is formed with a series of seats in its inner periphery, and a tubular resilient ring confined in the space between the disks, seat-flanges and inner wheel rim and formed with transverse lugs upon its inner and outer peripheries to fit into the seats.

SAMUEL OLDHAM.

Witnesses:
 C. D. McVay,
 J. C. McGlashen.